Jan. 29, 1963　　　D. G. DEDDO　　　3,075,429
INTEGRAL PANEL FOR SUNLIGHT CONTROL
Filed July 21, 1959
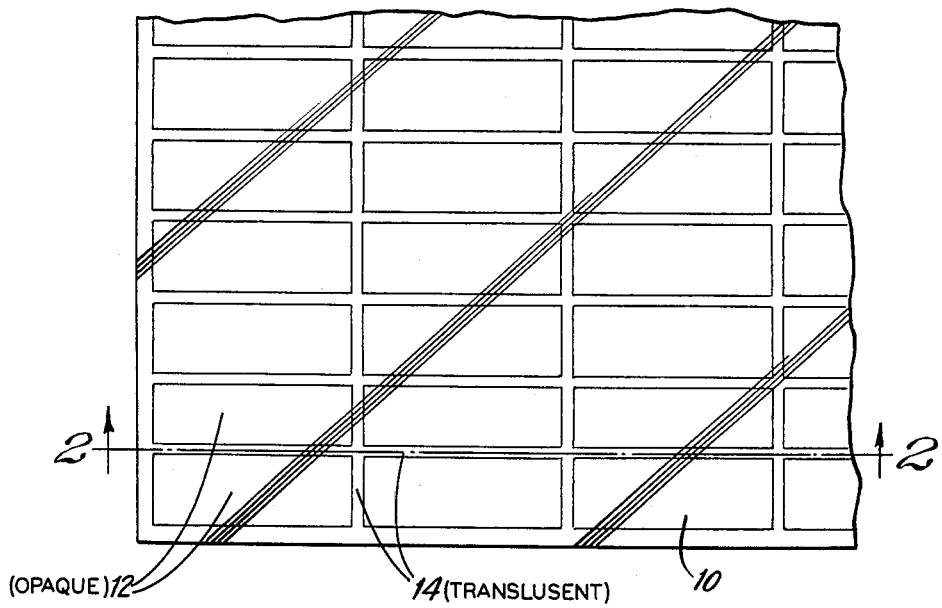
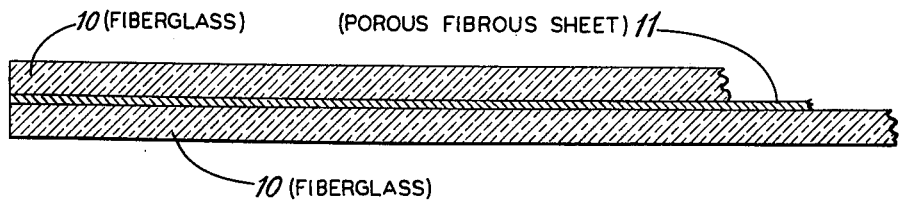
INVENTOR:
Daniel G. Deddo,
BY Bair, Freeman & Molinare
ATTORNEYS.

3,075,429
INTEGRAL PANEL FOR SUNLIGHT CONTROL
Daniel G. Deddo, 5101 W. St. Paul Ave., Chicago, Ill.
Filed July 21, 1959, Ser. No. 828,574
1 Claim. (Cl. 88—57.5)

This invention relates to sun reflecting shelter panels which are especially adapted for use for awnings, patio covers, and the like; or wherever it is desired to reflect, exclude, or diffuse sunlight. More particularly, the invention is directed to a novel panel construction formed of a plurality of laminations bonded together to form a relatively rigid, unitary panel structure.

One of the objects of this invention is to provide a novel form of panel, of the character indicated, which possesses substantial tensile and structural strength, and which is water proof, weather resistant and, in general, impervious to chemical corrosion.

Another object is to provide a novel form of panel of the character indicated which is capable of being produced in a manner so as to permit obtaining a wide variety of color selections and color designs.

A further object is to provide a novel panel of the character indicated, formed as a tri-laminate, comprising outer laminations of non-woven fiber glass, and an inner lamination of porous fibrous material, on which certain preselected areas have screen printing thereon with suitable opaque ink, to provide a panel wherein the areas containing opaque ink serve to reflect sunlight and heat, with the remainder of the panel being translucent to permit transmission of diffused light rays therethrough.

Still another object of this invention is to provide an improved panel of the character indicated which is economical to manufacture, efficient in use, and which is capable of being quickly and easily cleaned.

Other objects and advantages of this invention will be apparent from the following description, taken in connection with the accompanying drawing, in which:

FIGURE 1 is a fragmentary plan view of the novel panel embodying the present invention.

FIGURE 2 is an enlarged fragmentary sectional view through the panel, taken substantially as indicated at line 2—2 on FIGURE 1.

The sun reflecting shelter panel embodying the present invention is a multi-laminate, bonded together to form an unusually rigid, integral panel. In the construction illustrated in the drawing, the panel is a tri-laminate, composed of two outermost laminates, as indicated at 10, formed of fiber glass, and an intermediate laminate indicated at 11, formed of porous, fibrous material, such as paper or cloth. Paper is preferably utilized for purposes of economy. This intermediate laminate, preferably, initially is of a somewhat translucent nature.

The intermediate laminate 11 is formed, for example, of paper and has imprinted thereon, preferably by silk screen process, certain preselected areas as indicated at 12, utilizing opaque vinyl inks of any desired color. Due to the method of production of the panel, as hereinafter described, said panel has the general appearance as seen in FIGURE 1, including preselected areas as indicated at 12, having opaque characteristics, while all the remaining areas of the panel, as indicated at 14, having translucent characteristics.

As is well known, vinyl inks are available in a wide variety of colors and degrees of opacity, and it is to be understood that the outline or design of the preselected areas may be of a shape, design and size to suit the particular desires.

The multi-laminate panel is produced in a conventional manner, and will be briefly described, as follows:

A sheet of paper of predetermined size, on which is printed by silk screen process a plurality of preselected areas of desired size and configuration by the use of vinyl ink of a desired color and opacity, is interposed between a pair of mats of substantially corresponding size, made of fiber glass rovings. The assembly, comprising the three laminates, is then immersed in a bath of resin, such as polyester or epoxy resin, after which the tri-laminate is enveloped at opposite faces by a sheet of regenerated cellulose or acetate, and the entire assembly is then passed through a pair of pressure rollers for compacting the mass, after which the assembly is cut and trimmed to a predetermined size, and is subjected to heat and pressure until it is cured in a well known manner. By the utilization of resin, which completely impregnates the fiber glass rovings and the printed sheet 11, the finished panel becomes infusable and relatively rigid. If the outer enveloping sheets of regenerated cellulose or acetate are smooth, the outer finished surface of the panel likewise will be smooth. For certain purposes or appearances, sometimes one or both of the outer enveloping sheets of cellulose or acetate are of a crinkled nature and thereby imparts a corresponding finish to the outer surface of the completed tri-laminated panel.

After the panels are completely formed, the enveloping sheets of cellulose or acetate may be immediately removed, or may be permitted to remain in association with the panel until such time as the panel is used.

In producing the tri-laminate panel, the printed intermediate paper laminate 11, is coated in the preselected areas with the thickness of the vinyl ink as may be desired, depending upon the ultimate finished appearance desired. The opacity of the color employed determines the degree of light and heat penetration of the finished panel, and such opaque areas, when viewed from either side of the finished panel, have the same appearance; and the portions of the intermediate sheet 11, which are not coated with the ink, because of the impregnation with the resin, impart a translucent appearance to the remaining areas of the panel, as indicated at 14.

While the particular design or configuration of opaque areas employed may be varied widely so as to provide a relatively wide range of light transmission areas, it is preferred that said opaque areas be of a form and size so as to comprise a minimum of 40% of the utilizable area of the panel for use as a sun reflecting shelter panel, in the nature of an awning, or the like.

It is recognized that opaque materials, such as the vinyl inks employed, provide light and heat reflection, and when these panels are utilized as a sun reflecting shelter panel in the nature of an awning or the top for a patio, or the like, the temperature immediately beneath the panel is considerably less than above the panel. This result may be further enhanced by the selection of the proper colors of the vinyl ink employed. For example, if metallic inks, such as aluminum, are utilized for printing of the selected areas on the intermediate laminate, there will be a greater amount of light and heat reflection from the panel. The translucent areas interspersed between the opaque areas of the panel serve to provide a controlled amount of penetration of light rays through the panel, and by reason of the translucency of certain areas, the light rays are caused to be diffused and softened, thereby eliminating harsh brightness or glare.

The colors of the opaque areas in the panel are at all times preserved and protected by reason of the fiber glass laminates at opposite sides and, hence, it is possible to obtain a substantially maximum fastness of the colors.

Panels embodying the present invention possess high tensile and structural strength, are water proof and weather resistant, and are not readily subject to chemical corrosion.

While I have herein shown and described a panel in the nature of a tri-laminate, a relatively satisfactory product may also be produced as a bi-laminate comprising a single laminate of fiber glass rovings to which is integrally bonded a sheet of porous, fibrous material, such as paper or cloth having preselected areas printed thereon as above described. The bonding and forming of the bi-laminate panel may be produced in a manner similar to the tri-laminate panel above described.

Although I have herein shown and described certain preferred embodiments of my invention, manifestly it is capable of further modification and rearrangement without departing from the spirit and scope thereof. I do not, therefore, wish to be understood as limiting this invention to the precise embodiments herein disclosed, except as I may be so limited by the appended claim.

I claim:

A rigid, bonded, unitary sunlight and heat control panel comprising a tri-laminate having outer laminates formed of mats of fiber glass rovings and an inner laminate of porous fibrous material provided with printing thereon, with opaque ink having light and heat reflecting characteristics, in certain preselected areas, the outer and inner laminations being bonded together by means comprising a plastic resin for completely impregnating said laminations to provide a unitary panel with translucent areas interspersed with light and heat reflecting areas formed by said opaque ink, whereby a substantial portion of the light and heat is reflected and the portion of the light transmitted being diffused.

References Cited in the file of this patent

UNITED STATES PATENTS

| | | |
|---|---|---|
| 1,487,705 | Bateman | Mar. 25, 1924 |
| 2,009,167 | Delano | July 23, 1935 |
| 2,039,998 | Hollister | May 5, 1936 |
| 2,053,173 | Astima | Sept. 1, 1936 |
| 2,327,918 | Miller | Aug. 24, 1943 |
| 2,931,117 | Bosworth et al. | Apr. 5, 1960 |